(12) United States Patent
Oda et al.

(10) Patent No.: US 11,088,369 B2
(45) Date of Patent: Aug. 10, 2021

(54) CLAD MATERIAL FOR NEGATIVE ELECTRODE COLLECTOR OF SECONDARY BATTERY AND METHOD FOR MANUFACTURING THE SAME

(71) Applicant: HITACHI METALS, LTD., Tokyo (JP)

(72) Inventors: Yoshimitsu Oda, Suita (JP); Ryoji Inoue, Suita (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/321,192

(22) PCT Filed: Dec. 20, 2017

(86) PCT No.: PCT/JP2017/045825
§ 371 (c)(1),
(2) Date: Jan. 28, 2019

(87) PCT Pub. No.: WO2018/128081
PCT Pub. Date: Jul. 12, 2018

(65) Prior Publication Data
US 2019/0181456 A1    Jun. 13, 2019

(30) Foreign Application Priority Data
Jan. 6, 2017   (JP) .............................. JP2017-001300

(51) Int. Cl.
*H01M 4/66*        (2006.01)
*C22F 1/10*        (2006.01)
(Continued)

(52) U.S. Cl.
CPC ............. *H01M 4/667* (2013.01); *C22C 19/03* (2013.01); *C22F 1/00* (2013.01); *C22F 1/08* (2013.01);
(Continued)

(58) Field of Classification Search
CPC combination set(s) only.
See application file for complete search history.

(56) References Cited

U.S. PATENT DOCUMENTS 3,528,808 A * 9/1970 Lemkey .................. C22C 47/00
148/404
4,043,841 A * 8/1977 Bibring ................. C22C 19/056
148/404
(Continued)

FOREIGN PATENT DOCUMENTS

CN    103441283 A    12/2013
CN    203398222 U    1/2014
(Continued)

OTHER PUBLICATIONS

J.R. Davis: "Alloying," Dec. 1, 2001, ASM, USA IBN: 0-087170-744-6 vol. 1, pp. 460, 496-499 (Year: 2001).*
(Continued)

*Primary Examiner* — Amanda J Barrow
(74) *Attorney, Agent, or Firm* — Westerman, Hattori, Daniels & Adrian LLP

(57) ABSTRACT

A clad material (50) for a negative electrode collector of a secondary battery includes a Ni alloy layer (51) made of a Ni alloy that contains 0.005 mass % or more and 0.50 mass % or less of C, Ni, and inevitable impurities, and a pair of Cu layers (52, 53) respectively bonded to opposite surfaces of the Ni alloy layer and that contain 99 mass % or more of Cu.

3 Claims, 3 Drawing Sheets

(51) Int. Cl.
  *C22F 1/08* (2006.01)
  *C22C 19/03* (2006.01)
  *C22F 1/00* (2006.01)
  *H01M 4/02* (2006.01)

(52) U.S. Cl.
  CPC ............... *C22F 1/10* (2013.01); *H01M 4/66* (2013.01); *H01M 4/662* (2013.01); *H01M 2004/027* (2013.01)

(56) References Cited

U.S. PATENT DOCUMENTS

| | | | |
|---|---|---|---|
| 2002/0006350 A1* | 1/2002 | Nishida | C22C 38/001 420/94 |
| 2008/0292963 A1 | 11/2008 | Sato et al. | |
| 2014/0373751 A1* | 12/2014 | Schuh | C23C 14/35 106/286.1 |
| 2015/0349347 A1 | 12/2015 | Oda et al. | |
| 2017/0162877 A1 | 6/2017 | Oda et al. | |

FOREIGN PATENT DOCUMENTS

| | | | | | |
|---|---|---|---|---|---|
| JP | 2-236250 | A | | 9/1990 | |
| JP | 9-92290 | A | | 4/1997 | |
| JP | 10-183304 | | * | 7/1998 | ............ C22C 38/00 |
| JP | 2006-051523 | | * | 2/2006 | ............ B23K 20/00 |
| JP | 2006-51523 | A | | 2/2006 | |
| JP | 02006312779 | A | * | 11/2006 | ............ C22C 19/05 |
| JP | 2009-4363 | A | | 1/2009 | |
| JP | 2010-257695 | A | | 11/2010 | |
| JP | 2011-233349 | | * | 11/2011 | ............ H01M 4/66 |
| JP | 2011-233349 | A | | 11/2011 | |
| JP | 5329290 | | * | 10/2013 | ............ H01M 4/66 |
| JP | 5329290 | B2 | | 10/2013 | |
| JP | 2014-22271 | A | | 2/2014 | |
| JP | 2015-225847 | A | | 12/2015 | |

OTHER PUBLICATIONS

"Electrical conductivity of the elements," accessed on Dec. 9, 2019 at https://periodictable.com/Properties/A/ElectricalConductivity.al. html#Carbon.ElectricalConductivity.note (Year: 2019).*

Su et al., "The influence of niobium, chromium, molybdenum and carbon on the sliding wear behavior of nickel-base hardfacing alloys," Wear 209 (1997) 160-170 (Year: 1997).*

Smith et al., "The role of Niobium in Wrought Precipitation-Hardened Nicel-Base Alloys," Superalloys 719, 625, 706 and Derivatives 2005, TMS (The Minerals, Metals, & Materials Society), 2005 (Year: 2005).*

Thompson et al., "The Relationship between Carbon Content, Microstructure, and Integranular Liquation Cracking in Cast Nickel Alloy 718," Metallurgical Transactions A, vol. 22A, Feb. 1991, 557-567 (Year: 1991).*

Office Action dated Jul. 26, 2019, issued in counterpart CN Application No. 201780047423.0, with English translation (16 pages).

Extended (Supplementary) Search Report dated Jul. 29, 2019, issued in counterpart EP Application No. 17889900.1 (8 pages).

Office Action dated Mar. 2, 2020, issued in counterpart CN Application No. 201780047423.0, with English translation (15 pages).

International Search Report dated Mar. 13, 2018, issued in counterpart application No. PCT/JP2017/045825, w/ English translation (5 pages).

Written opinion in Japanese dated Mar. 13, 2018, issued in counterpart application No. PCT/JP2017/045825, w/ English translation (7 pages).

Decision to Grant a Patent dated May 15, 2018, issued in counterpart Japanese Patent Application No. 2017-001300, w/English translation (6 pages).

* cited by examiner

CLAD MATERIAL FOR NEGATIVE ELECTRODE COLLECTOR OF SECONDARY BATTERY AND METHOD FOR MANUFACTURING THE SAME

TECHNICAL FIELD

The present invention relates to a clad material for a negative electrode collector of a secondary battery and a method for manufacturing the same.

BACKGROUND ART

Currently, in a lithium-ion battery as a secondary battery, a negative electrode material (negative electrode active material) that can further increase the amount of Li (lithium) that can be inserted and desorbed is desired in order to improve the energy density of the battery. Therefore, a non-carbon material such as an oxide of Si (silicon) or an oxide of Sn (tin) that can further increase the amount of Li that can be inserted and desorbed than a carbon material tends to be used as a negative electrode material in place of a carbon material (graphite), which is a common negative electrode material, for example. However, when the amount of Li that can be inserted and desorbed increases, fluctuations in the volume of a negative electrode material become large due to expansion and contraction of the negative electrode material caused by insertion of Li during charging and desorption of Li during discharging. Thus, in a negative electrode collector on which the negative electrode material is placed, a large stress repeatedly acts due to the large volume fluctuations caused by the expansion and contraction of the negative electrode material. Therefore, improvement of the mechanical strength of the negative electrode collector is required in order to withstand the large stress.

Therefore, in general, a negative electrode collector with improved mechanical strength, used for a lithium-ion battery as a secondary battery is known. Such a negative electrode collector is disclosed in Japanese Patent No. 5329290, for example.

Japanese Patent No. 5329290 discloses a clad material (copper layer/nickel-based metal layer/copper layer) having a three-layer structure and used as a material for a negative electrode collector of a lithium-ion battery, in which copper layers are pressure-welded and diffusion-bonded to opposite surfaces of a nickel-based metal layer made of nickel-based metal, respectively. In the clad material having a three-layer structure described in Japanese Patent No. 5329290, the mechanical strength of the negative electrode collector is improved by changing the thickness of the nickel-based metal layer with respect to the total thickness of the clad material. In addition, Japanese Patent No. 5329290 discloses that an alloy (Ni—Nb alloy, Ni—Cr alloy, Ni—Ti alloy, Ni—Co alloy, Ni—Mo alloy, or Ni—Ta alloy) containing pure Ni (nickel) or 90 mass % or more of pure Ni is used as the nickel-based metal of the clad material.

Here, a current flows through the negative electrode collector, and thus the negative electrode collector is required not only to have a high mechanical strength but also to have a low volume resistivity.

PRIOR ART DOCUMENT

Patent Document

Patent Document 1: Japanese Patent No. 5329290

SUMMARY OF THE INVENTION

Problems to be Solved by the Invention

In Japanese Patent No. 5329290, the mechanical strength of the negative electrode collector made of the clad material having a three-layer structure is improved by changing the thickness of the nickel-based metal layer with respect to the total thickness of the clad material. However, in the clad material disclosed in Japanese Patent No. 5329290, the electric resistance (volume resistivity) of the nickel-based metal layer is larger than that of the copper layer, and thus as the ratio of the thickness of the nickel-based metal layer to the copper layer increases, the electric resistance (volume resistivity) of the clad material increases. Therefore, there are limitations to increase the thickness of the nickel-based metal layer with respect to the thickness of the copper layer in order to improve the mechanical strength because the volume resistivity is increased. Therefore, means other than changing the thickness ratio of each layer of the clad material is required in order to further improve the mechanical strength of the negative electrode collector.

The present invention has been proposed in order to solve the aforementioned problems, and an object of the present invention is to provide a clad material for a negative electrode collector of a secondary battery capable of further improving the mechanical strength of the negative electrode collector while an increase in the electric resistance (volume resistivity) of the negative electrode collector is significantly reduced or prevented by means other than changing the thickness ratio of each layer of the clad material, and a method for manufacturing the same.

Means for Solving the Problems

As a result of earnest investigations especially focusing on the aforementioned metal material of which the conventional clad material is made, the inventors of the present invention have found the following structures capable of achieving the aforementioned object. A clad material for a negative electrode collector of a secondary battery according to a first aspect of the present invention includes a Ni alloy layer made of a Ni alloy that contains 0.005 mass % or more and 0.50 mass % or less of C, Ni, and inevitable impurities, and a pair of Cu layers respectively bonded to opposite surfaces of the Ni alloy layer and that contain 99 mass % or more of Cu.

In the clad material for a negative electrode collector of a secondary battery according to the first aspect of the present invention, as described above, the Ni alloy layer is made of the Ni alloy that contains 0.005 mass % or more and 0.50 mass % or less of C (carbon), Ni (nickel), and inevitable impurities. Accordingly, the Ni alloy layer is made of the Ni alloy that contains 0.005 mass % or more of C such that the mechanical strength of the Ni alloy can be improved as compared with the case in which the Ni alloy layer is made of a Ni alloy that contains less than 0.005 mass % of C. Consequently, in the clad material including the Ni alloy layer and the pair of Cu layers respectively bonded to the opposite surfaces of the Ni alloy layer, the mechanical strength of the negative electrode collector can be further improved while an increase in the electric resistance (volume resistivity) of the negative electrode collector is significantly reduced or prevented by means other than changing the thickness ratio of each layer of the clad material.

In the clad material for a negative electrode collector of a secondary battery according to the first aspect, the Ni alloy layer is made of the Ni alloy that contains 0.50 mass % or less of C such that deterioration of the rollability of a Ni alloy plate material and the clad material can be significantly reduced or prevented both at the time of producing the Ni alloy plate material used to produce the clad material and at the time of producing the clad material. Thus, the clad material can be easily rolled to a predetermined thickness, and thus the clad material can be easily used as the negative electrode collector.

In the aforementioned clad material for a negative electrode collector of a secondary battery according to the first aspect, the Ni alloy preferably contains 0.005 mass % or more and 0.40 mass % or less of C. According to this structure, the Ni alloy layer is made of the Ni alloy that contains 0.40 mass % or less of C such that deterioration of the rollability of the Ni alloy plate material and the clad material can be further significantly reduced or prevented.

In the aforementioned clad material for a negative electrode collector of a secondary battery according to the first aspect, the Ni alloy preferably contains only C, Ni, and inevitable impurities. According to this structure, in the Ni alloy, elements other than C are not substantially added to Ni, and thus an increase in the volume resistivity of the Ni alloy can be significantly reduced or prevented.

In this case, the Ni alloy preferably contains 0.005 mass % or more and 0.20 mass % or less of C. The Ni alloy more preferably contains 0.10 mass % or more and 0.20 mass % or less of C. According to this structure, the Ni alloy layer is made of the Ni alloy that contains 0.005 mass % or more (preferably 0.10 mass % or more) of C such that the mechanical strength of the Ni alloy can be effectively improved, and thus the mechanical strength of the negative electrode collector can be effectively improved. Furthermore, the Ni alloy layer is made of the Ni alloy that contains 0.20 mass % or less of C such that deterioration of the rollability of the Ni alloy plate material and the clad material can be sufficiently significantly reduced or prevented.

In the aforementioned clad material for a negative electrode collector of a secondary battery according to the first aspect, the Ni alloy preferably contains only C, Ni, Nb, and inevitable impurities. According to this structure, not only C but also Nb is added to Ni such that the mechanical strength of the Ni alloy can be further improved, and thus the mechanical strength of the negative electrode collector can be further improved.

In the aforementioned structure in which the Ni alloy contains only C, Ni, Nb, and inevitable impurities, the Ni alloy preferably contains 3.0 mass % or more and 10.0 mass % or less of Nb. The Ni alloy more preferably contains 4.7 mass % or more and 5.5 mass % or less of Nb. According to this structure, the Ni alloy layer is made of the Ni alloy that contains 3.0 mass % or more (preferably 4.7 mass % or more) of Nb such that the mechanical strength of the Ni alloy can be further improved, and thus the mechanical strength of the negative electrode collector can be further improved. Furthermore, the Ni alloy layer is made of the Ni alloy that contains 10.0 mass % or less (preferably 5.5 mass % or less) of Nb such that an increase in the volume resistivity of the Ni alloy can be significantly reduced or prevented, and thus an increase in the volume resistivity of the negative electrode collector can be significantly reduced or prevented.

In the aforementioned structure in which the Ni alloy contains only C, Ni, Nb, and inevitable impurities, the Ni alloy preferably contains 0.10 mass % or more and 0.40 mass % or less of C. The Ni alloy more preferably contains 0.19 mass % or more and 0.40 mass % or less of C.

According to this structure, the Ni alloy layer is made of the Ni alloy that contains 0.10 mass % or more (preferably 0.19 mass % or more) of C and Nb such that the mechanical strength of the Ni alloy can be effectively improved. Furthermore, the Ni alloy layer is made of the Ni alloy that contains 0.40 mass % or less of C and Nb such that deterioration of the rollability of the Ni alloy plate material and the clad material can be sufficiently significantly reduced or prevented when the Ni alloy layer is made of the Ni alloy in which Nb is added.

A method for manufacturing a clad material for a negative electrode collector of a secondary battery according to a second aspect of the present invention includes producing a Ni alloy plate material made of a Ni alloy that contains 0.005 mass % or more and 0.50 mass % or less of C, Ni, and inevitable impurities by performing hot rolling and cold rolling on a smelted material in which C is added to pure Ni, and producing a clad material including a Ni alloy layer made of the Ni alloy and a pair of Cu layers respectively bonded to opposite surfaces of the Ni alloy layer and that contain 99 mass % or more of Cu by performing rolling and diffusion annealing in a state in which the Ni alloy plate material is sandwiched between a pair of Cu plate materials that contain 99 mass % or more of Cu.

In the method for manufacturing the clad material for a negative electrode collector of a secondary battery according to the second aspect of the present invention, as described above, the Ni alloy plate material made of the Ni alloy that contains 0.005 mass % or more and 0.50 mass % or less of C, Ni, and inevitable impurities is produced by performing hot rolling and cold rolling on the smelted material in which C is added to pure Ni. Accordingly, the negative electrode collector, the mechanical strength of which can be further improved while an increase in the electric resistance (volume resistivity) of the negative electrode collector is significantly reduced or prevented by means other than changing the thickness ratio of each layer of the clad material, can be produced. Furthermore, hot rolling and cold rolling are performed on the smelted material in which C is added to pure Ni such that C can be dispersed to not only the vicinity of a surface of the Ni alloy plate material but also the entire Ni alloy plate material, unlike the case in which C is diffused to the Ni alloy plate material by carburization, and thus not only the mechanical strength of the surface of the Ni alloy plate material but also the mechanical strength of the entire Ni alloy plate material can be increased. Furthermore, no carburization step is required, and thus a manufacturing process of the clad material for a negative electrode collector can be shortened.

Effect of the Invention

According to the present invention, as described above, the clad material for a negative electrode collector of a secondary battery capable of further improving the mechanical strength of the negative electrode collector while an increase in the electric resistance (volume resistivity) of the negative electrode collector is significantly reduced or prevented by the means other than changing the thickness ratio of each layer of the clad material, and the method for manufacturing the same can be provided.

MODES FOR CARRYING OUT THE INVENTION

An embodiment of the present invention is hereinafter described on the basis of the drawings.

The structure of a battery 100 using a clad material 50 for a negative electrode collector (hereinafter referred to as a "clad material 50") according to the embodiment of the present invention is now described with reference to FIGS. 1 and 2.

(Structure of Battery)

Figure 1:
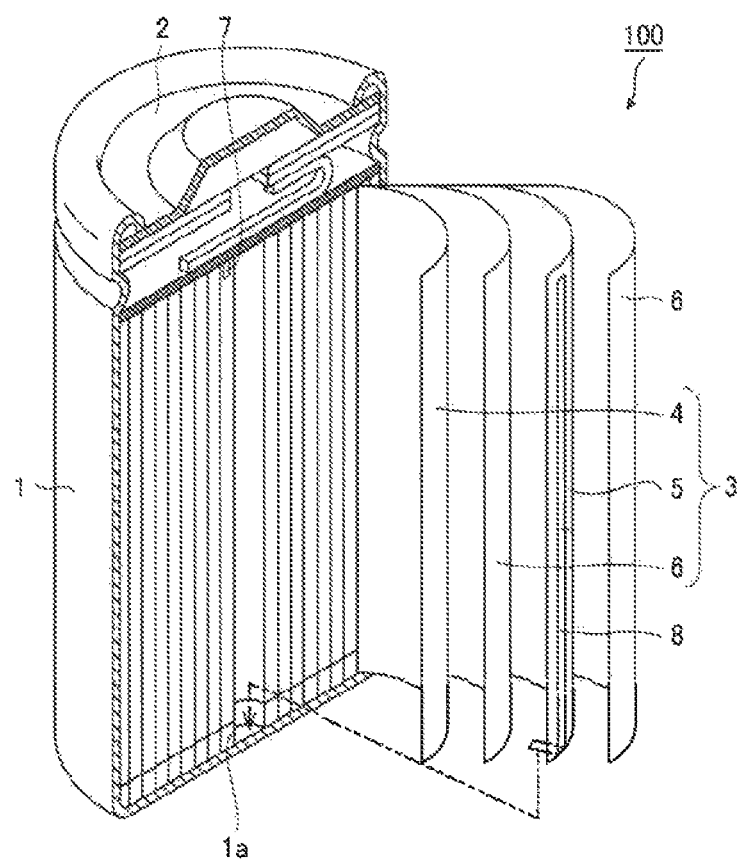
FIG. 1 A schematic sectional view showing a battery according to an embodiment of the present invention.

As shown in FIG. 1, the battery 100 according to the embodiment of the present invention is a so-called cylindrical lithium-ion secondary battery. This battery 100 includes a cylindrical housing 1, a lid member 2 that seals an opening of the housing 1, and an electric storage element 3 disposed in the housing 1.

The housing 1 houses the electric storage element 3 and an electrolyte (not shown). The lid member 2 is made of an aluminum alloy, for example, and also serves as a positive electrode terminal (battery positive electrode) of the battery 100. The electric storage element 3 is formed by winding a positive electrode 4, a negative electrode 5, and an insulating separator 6 disposed between the positive electrode 4 and the negative electrode 5. The positive electrode 4 includes a positive electrode material (positive electrode active material) such as lithium manganate and a positive electrode collector made of aluminum foil. The positive electrode material is fixed onto a surface of the positive electrode collector by a binder or the like. Furthermore, a positive electrode lead member 7 that electrically connects the lid member 2 to the positive electrode 4 is fixed to the positive electrode 4.

Figure 2:
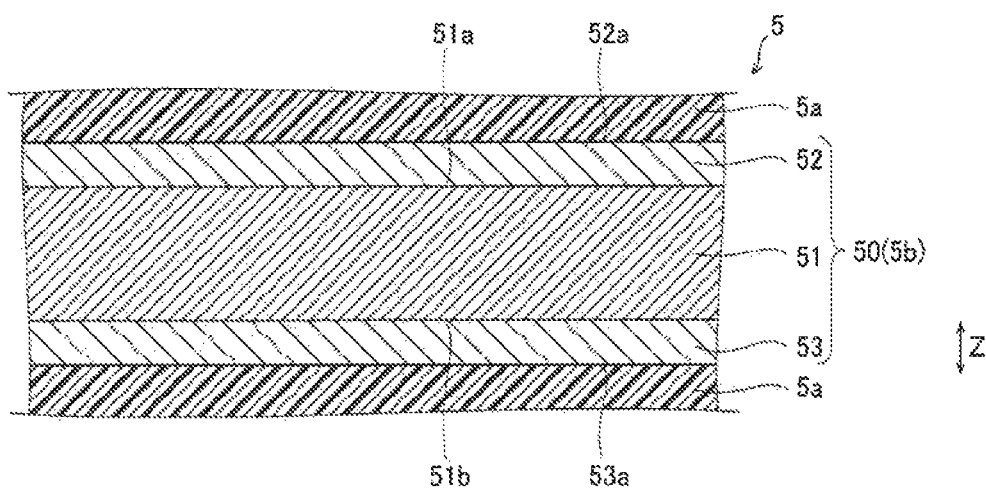
FIG. 2 A sectional view showing a negative electrode according to the embodiment of the present invention.

As shown in FIG. 2, the negative electrode 5 includes a negative electrode material 5a and a negative electrode collector 5b to which the negative electrode material 5a is fixed by a binder or the like. The negative electrode material 5a includes a material capable of insertion and desorption of lithium, such as carbon, SnO, or SiO. The negative electrode material 5a expands and contracts in accordance with insertion and desorption of lithium, respectively.

The negative electrode collector 5b is made of the clad material 50 having a three-layer structure including a Ni alloy layer 51 made of a Ni alloy and Cu layers 52 and 53 bonded to opposite surfaces 51a and 51b of the Ni alloy layer 51 in a thickness direction (direction Z), respectively. At a bonding interface between the Ni alloy layer 51 and the Cu layer 52 and at a bonding interface between the Ni alloy layer 51 and the Cu layer 53, bonding between metals at the atomic level occurs. The negative electrode material 5a is fixed onto each of a surface 52a of the Cu layer 52 opposite to the side bonded to the Ni alloy layer 51 and a surface 53a of the Cu layer 53 opposite to the side bonded to the Ni alloy layer 51.

As shown in FIG. 1, a negative electrode lead member 8 that electrically connects the inner bottom surface 1a of the housing 1 to the negative electrode 5 is fixed to the negative electrode 5. Specifically, the negative electrode lead member 8 is bonded to the negative electrode collector 5b by ultrasonic welding. The negative electrode lead member 8 is bonded to a portion (not shown) to which the negative electrode material 5a is not fixed. Furthermore, the negative electrode lead member 8 is bonded to the inner bottom surface 1a of the housing 1 by resistance welding.

(Composition of Ni Alloy)

According to the present embodiment, the Ni alloy of which the Ni alloy layer 51 is made contains 0.005 mass % or more and 0.50 mass % or less of C, Ni, and inevitable impurities. In this case, the Ni alloy preferably contains about 0.40 mass % or less of C.

According to the present embodiment, the Ni alloy of which the Ni alloy layer 51 is made may include an alloy to which rare elements such as Nb and Ta are not added. Specifically, the Ni alloy may contain only 0.005 mass % or more and 0.50 mass % or less of C, Ni, and inevitable impurities. Thus, elements other than C are not substantially contained in Ni, and thus an increase in the volume resistivity of the Ni alloy can be significantly reduced or prevented.

In this case, the Ni alloy that contains only C, Ni, and inevitable impurities preferably contains about 0.20 mass % or less of C. Thus, C can be easily melted into molten Ni at the time of producing a Ni alloy plate material, and thus the Ni alloy layer 51 can be more reliably formed. Furthermore, the Ni alloy that contains only C, Ni, and inevitable impurities preferably contains 0.10 mass % or more of C. Thus, the mechanical strength (tensile strength) of the clad material 50 having a three-layer structure including the Ni alloy layer 51 can be sufficiently improved by about 1.35 times or more as compared with the case in which C is not added to the Ni alloy.

According to the present embodiment, the Ni alloy of which the Ni alloy layer 51 is made may contain 10.0 mass % or less of one or more of Nb, Ta, and Cr in addition to 0.005 mass % or more and 0.50 mass % or less of C, Ni, and inevitable impurities. Thus, the mechanical strength of each of the Ni alloy layer 51 and the clad material 50 can be improved.

In this case, the Ni alloy that contains one or more of Nb, Ta, and Cr preferably contains only 0.005 mass % or more and 0.50 mass % or less of C, Ni, Nb, and inevitable impurities. The Ni alloy to which Nb is added more preferably contains 3.0 mass % or more (still more preferably contains 4.7 mass % or more) of Nb. Thus, the mechanical strength of the Ni alloy layer 51 can be improved. Furthermore, the Ni alloy to which Nb is added more preferably contains 10.0 mass % or less (still more preferably contains 5.5 mass % or less) of Nb. Thus, the mechanical strength of each of the Ni alloy layer 51 and the clad material 50 can be improved while an increase in the electric resistance (volume resistivity) of the negative electrode collector 5b is significantly reduced or prevented.

The Ni alloy to which Nb is added preferably contains about 0.40 mass % or less of C. Thus, C can be easily melted into molten Ni at the time of producing a Ni alloy plate material, and thus the Ni alloy layer 51 can be more reliably formed. Furthermore, the Ni alloy to which Nb is added preferably contains 0.10 mass % or more of C. Thus, the mechanical strength (tensile strength) of the clad material 50 having a three-layer structure including the Ni alloy layer 51 can be improved by about 1.04 times or more as compared with the case in which C is not added to the Ni alloy. Furthermore, the Ni alloy to which Nb is added more preferably contains 0.19 mass % or more of C. Thus, the mechanical strength (tensile strength) of the clad material 50 having a three-layer structure including the Ni alloy layer 51 can be improved by about 1.06 times or more as compared with the case in which C is not added to the Ni alloy.

The Ni alloy may contain Si, Mn (manganese), Al (aluminum), Fe (iron), Mg (magnesium), O (oxygen), N (nitrogen), etc. as inevitable impurities in some cases. However, the volume resistivity of the Ni alloy that contains a large amount of inevitable impurities may increase, and thus the content of inevitable impurities is preferably 0.50 mass % or less, and more preferably 0.20 mass % or less.

Specifically, the Ni alloy may contain 0.02 mass % or less of Si as inevitable impurities. The Ni alloy may contain 0.05 mass % or less of Mn as inevitable impurities. The Ni alloy may contain 0.01 mass % or less of Al as inevitable impurities. The Ni alloy may contain 0.02% or less of Fe as inevitable impurities. The Ni alloy may contain 0.01 mass % or less of Mg as inevitable impurities. The Ni alloy may contain 0.001 mass % or less of O as inevitable impurities. The Ni alloy may contain 0.001 mass % or less of N as inevitable impurities.

Both the Cu layers 52 and 53 contain 99 mass % or more of Cu (copper). For example, the Cu layers 52 and 53 contain oxygen free copper that contains 99.96 mass % or more of Cu, phosphorus deoxidized copper that contains 99.75 mass % or more of Cu, or tough pitch copper that contains 99.9 mass % or more of Cu. The Cu layer 52 and the Cu layer 53 may be made of Cu materials having the same composition, or Cu materials having different compositions.

In the clad material 50, the thickness ratio of the Cu layer 52, the Ni alloy layer 51, and the Cu layer 53 (the thickness of the Cu layer 52:the thickness of the Ni alloy layer 51:the thickness of the Cu layer 53) in the direction Z is 1:3:1. The thickness ratio of the Cu layer 52, the Ni alloy layer 51, and the Cu layer 53 is not limited to 1:3:1. That is, the thickness of the Ni alloy layer 51 is not necessarily larger than the thickness of the Cu layer 52 and the thickness of the Cu layer 53, but the thickness of the Ni alloy layer 51 may be smaller than or equal to the thickness of the Cu layer 52 and the thickness of the Cu layer 53. Furthermore, the thickness of the Cu layer 52 and the thickness of the Cu layer 53 may be different from each other.

(Manufacturing Process of Clad Material for Negative Electrode Collector)

A manufacturing process of the clad material 50 used as the negative electrode collector 5b is now described with reference to FIGS. 2 to 5.

Figure 3:
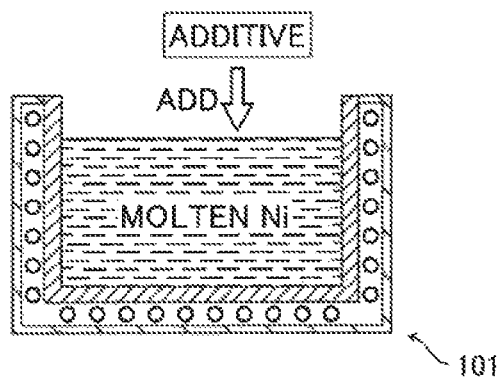
FIG. 3 A schematic view illustrating a method for producing a Ni alloy plate material according to the embodiment of the present invention.

First, a Ni alloy ingot 151 (see FIG. 4) to which 0.005 mass % or more and 0.50 mass % or less of C is added is prepared. Note that one or more of Nb, Ta, and Cr may be added to the Ni alloy ingot 151. As shown in FIG. 3, this Ni alloy ingot 151 is produced by adding an additive including an additive element such as C to molten Ni in a melting furnace 101 and thereafter cooling the molten Ni. Incidentally, the Ni alloy ingot 151 may be produced as an ingot using an ingot case (not shown), or may be produced as a casting by a continuous casting method. The ingot 151 is an example of a "smelted material" in the claims.

Figure 4:
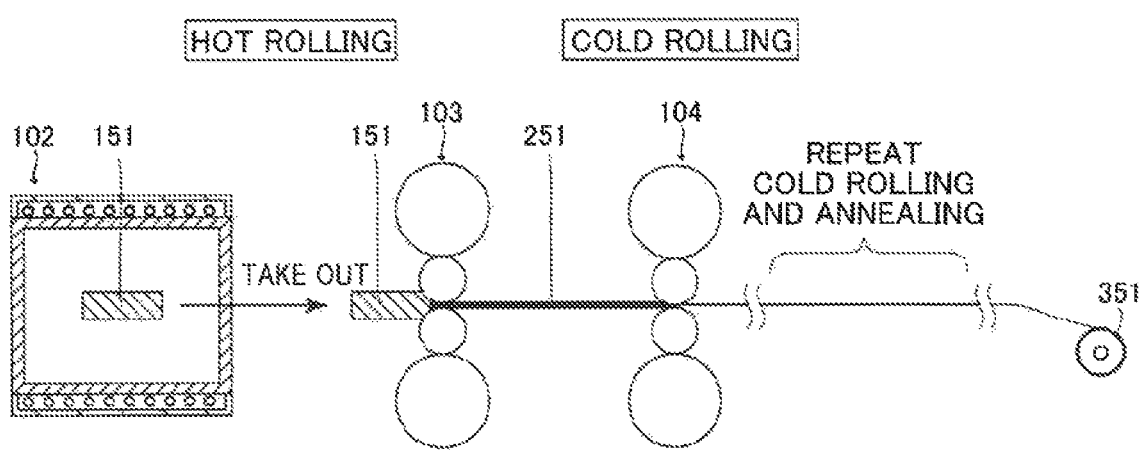
FIG. 4 A schematic view illustrating the method for producing the Ni alloy plate material according to the embodiment of the present invention.

As shown in FIG. 4, a hot-rolled Ni alloy plate material 251 is produced by hot-rolling the Ni alloy ingot 151. Specifically, the Ni alloy ingot 151 is heated to a hot rolling temperature higher than the recrystallization temperature of the Ni alloy in a state in which the Ni alloy ingot 151 is placed in a furnace 102. Then, the heated Ni alloy ingot 151 is taken out from the furnace 102, and is hot-rolled by rolling using a roller 103. Thus, the hot-rolled Ni alloy plate material 251 is produced. In this case, the thickness of the hot-rolled Ni alloy plate material 251 may be about 10 times the thickness of a final Ni alloy plate material.

Thereafter, cold rolling is performed on the hot-rolled Ni alloy plate material 251. Specifically, cold rolling is performed by cooling the hot-rolled Ni alloy plate material 251 to room temperature and rolling the hot-rolled Ni alloy plate material 251 using a roller 104 after cooling. Then, annealing is performed in order to remove distortion due to the cold rolling. Then, cold rolling and annealing are repeated such that a Ni alloy plate material 351 having a predetermined thickness is produced. In this case, the thickness of the Ni alloy plate material 351 may be rolled to about 0.1 times the thickness of the hot-rolled plate material 251.

Figure 5:
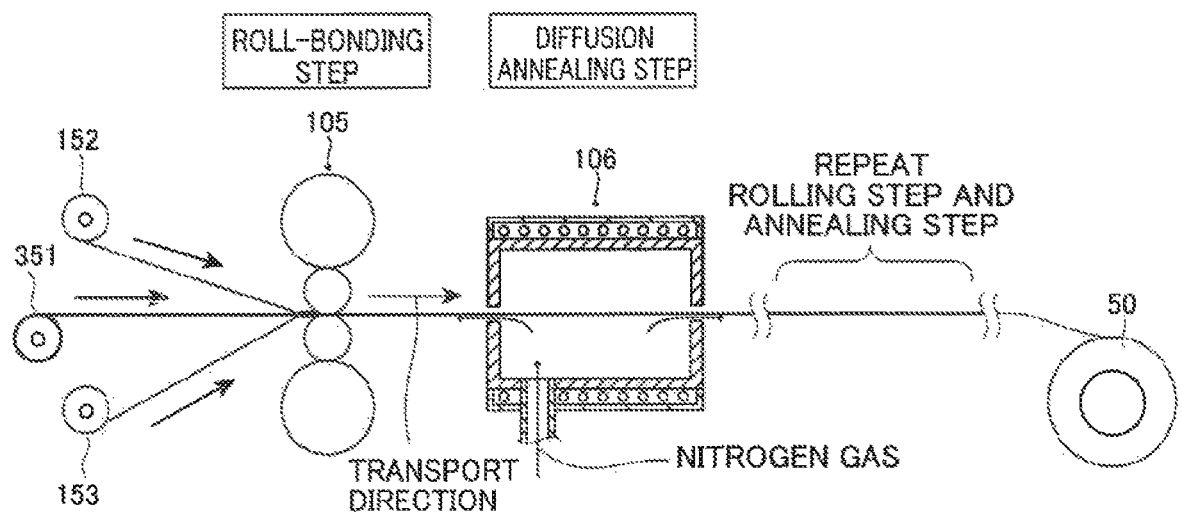
FIG. 5 A schematic view illustrating a method for producing a clad material of which a negative electrode collector is made according to the embodiment of the present invention.

A pair of Cu plate materials 152 and 153 that contain 99 mass % or more of Cu are prepared. Then, as shown in FIG. 5, a roll-bonding step of bonding the pair of Cu plate members 152 and 153 to the Ni alloy plate material 351 is performed. Specifically, rolling is performed using a roller 105 in a state in which the Ni alloy plate material 351 is sandwiched between the pair of Cu plate materials 152 and 153 in the thickness direction. Then, diffusion annealing is performed on a plate material in which the pair of Cu plate materials 152 and 153 are bonded to the Ni alloy plate material 351. Specifically, the plate material in which the pair of Cu plate materials 152 and 153 are bonded to the Ni alloy plate material 351 is passed through an annealing furnace 106 in which a non-oxidizing atmosphere such as a nitrogen atmosphere is created. Thus, diffusion annealing is performed on the plate material in which the pair of Cu plate materials 152 and 153 are bonded to the Ni alloy plate material 351 under a non-oxidizing atmosphere. As the non-oxidizing atmosphere, a hydrogen atmosphere, a mixed atmosphere of hydrogen and nitrogen, and an inert gas atmosphere such as an argon atmosphere, for example, in addition to the nitrogen atmosphere may be used.

Then, a cold rolling step and an annealing step under a non-oxidizing atmosphere are repeated until the plate material in which the pair of Cu plate materials 152 and 153 are bonded to the Ni alloy plate material 351 reaches a predetermined thickness. Diffusion annealing and annealing are performed under a non-oxidizing atmosphere such that formation of a thick oxide layer on the surface 52a of the Cu layer 52 and the surface 53a of the Cu layer 53 is significantly reduced or prevented, and thus an increase in the electric resistance of the clad material 50 due to an oxide layer can be significantly reduced or prevented.

Thus, the clad material 50 including the Ni alloy layer 51 made of the Ni alloy and the Cu layers 52 and 53 bonded to the Ni alloy layer 51 as shown in FIG. 2 is produced. In this case, from the viewpoint of mechanical strength, the thickness of the Ni alloy layer 51 is preferably 40% or more of the total thickness of the clad material 50. Diffusion annealing is performed such that bonding between metals at the atomic level is formed at the bonding interface between the Ni alloy layer 51 and the Cu layer 52 and at the bonding interface between the Ni alloy layer 51 and the Cu layer 53. In this case, the thickness of the clad material 50 is set to be equal to the thickness of the final negative electrode collector 5b, for example, about 5 μm or more and about 50 μm or less. Thereafter, the clad material 50 is cut into a predetermined size such that the negative electrode collector 5b is produced.

Effects of Present Embodiment

According to the present embodiment, the following effects are achieved.

According to the present embodiment, as described above, the Ni alloy layer 51 is made of the Ni alloy that contains 0.005 mass % or more and 0.50 mass % or less of C (carbon), Ni (nickel), and inevitable impurities. Accordingly, the Ni alloy layer 51 is made of the Ni alloy that contains 0.005 mass % or more of C such that the mechanical strength of the Ni alloy can be improved as compared with the case in which the Ni alloy layer is made of a Ni alloy that contains less than 0.005 mass % of C. Consequently, in the clad material 50 including the Ni alloy layer 51 and the pair of Cu layers 52 and 53 respectively bonded to the opposite surfaces 51a and 51b of the Ni alloy layer 51, the mechanical strength of the negative electrode collector 5b can be further improved while an increase in the electric resistance (volume resistivity) of the negative electrode collector 5b is significantly reduced or prevented by means other than changing the thickness ratio of each layer of the clad material 50.

According to the present embodiment, the Ni alloy layer 51 is made of the Ni alloy that contains 0.50 mass % or less of C. Accordingly, deterioration of the rollability of the Ni alloy plate material 351 and the clad material 50 can be significantly reduced or prevented both at the time of producing the Ni alloy plate material 351 used to produce the clad material 50 and at the time of producing the clad material 50. Thus, the clad material 50 can be easily rolled to a predetermined thickness, and thus the clad material 50 can be easily used as the negative electrode collector 5b.

According to the present embodiment, the Ni alloy layer 51 is preferably made of the Ni alloy that contains 0.40 mass % or less of C. According to this structure, deterioration of the rollability of the Ni alloy plate material 351 and the clad material 50 can be further significantly reduced or prevented.

According to the present embodiment, the Ni alloy preferably contains only C, Ni, and inevitable impurities. According to this structure, elements other than C are not substantially added to Ni, and thus an increase in the volume resistivity of the Ni alloy can be significantly reduced or prevented.

According to the present embodiment, the Ni alloy that contains only C, Ni, and inevitable impurities preferably contains 0.005 mass % or more (more preferably 0.10 mass % or more) of C. According to this structure, the mechanical strength of the Ni alloy can be effectively improved, and thus the mechanical strength of the negative electrode collector 5b can be effectively improved.

According to the present embodiment, the Ni alloy that contains only C, Ni, and inevitable impurities preferably contains 0.20 mass % or less of C. According to this structure, when the Ni alloy layer is made of the Ni alloy that contains only C, Ni, and inevitable impurities, deterioration of the rollability of the Ni alloy plate material 351 and the clad material 50 can be sufficiently significantly reduced or prevented.

According to the present embodiment, the Ni alloy preferably contains only C, Ni, Nb, and inevitable impurities. According to this structure, not only C but also Nb is added to Ni such that the mechanical strength of the Ni alloy can be further improved, and thus the mechanical strength of the negative electrode collector 5b can be further improved.

According to the present embodiment, the Ni alloy layer 51 is preferably made of the Ni alloy that contains 3.0 mass % or more (more preferably 4.7 mass % or more) of Nb. According to this structure, the mechanical strength of the Ni alloy can be further improved, and thus the mechanical strength of the negative electrode collector 5b can be further improved.

According to the present embodiment, the Ni alloy layer 51 is preferably made of the Ni alloy that contains 10.0 mass % or less (more preferably 5.5 mass % or less) of Nb. According to this structure, an increase in the volume resistivity of the Ni alloy can be significantly reduced or prevented, and thus an increase in the volume resistivity of the negative electrode collector 5b can be significantly reduced or prevented.

According to the present embodiment, the Ni alloy that contains only C, Ni, Nb, and inevitable impurities preferably contains 0.10 mass % or more (more preferably 0.19 mass % or more) of C. According to this structure, the mechanical strength of the Ni alloy can be effectively improved.

According to the present embodiment, the Ni alloy that contains only C, Ni, Nb, and inevitable impurities preferably contains 0.40 mass % or less of C. According to this structure, deterioration of the rollability of the Ni alloy plate material 351 and the clad material 50 can be sufficiently significantly reduced or prevented.

In the manufacturing method according to the present embodiment, the Ni alloy plate material 351 is produced by performing hot rolling and cold rolling on the Ni alloy ingot 151 in which C is added to pure Ni. Accordingly, C can be dispersed to not only the vicinity of a surface of the Ni alloy plate material 351 but also the entire Ni alloy plate material 351, unlike the case in which C is diffused to the Ni alloy plate material 351 by carburization, and thus not only the mechanical strength of the surface of the Ni alloy plate material 351 but also the mechanical strength of the entire Ni alloy plate material 351 (Ni alloy layer 51) can be increased. Furthermore, no carburization step is required, and thus the manufacturing process of the clad material 50 can be shortened.

EXAMPLES

Experiments (first to third examples) conducted to confirm the effects of the aforementioned embodiment are now described with reference to FIG. 6.

First Example

In a first example, Ni alloy plate materials in which Ni alloys contained only C, Ni, and inevitable impurities and the compositions of C were different from each other were produced. Then, the tensile strengths as indexes of the mechanical strengths and the volume resistivities of the produced Ni alloy plate materials were measured. Furthermore, clad materials each having a three-layer structure in which a Ni alloy layer made of the Ni alloy was sandwiched between a pair of Cu layers were produced, and the tensile strengths thereof were measured. In addition, the volume resistivities of the clad materials were calculated from the thickness ratios.

(Production of Ni Alloy Plate Materials of Test Materials)

First, Ni alloy plate materials of test materials 1 to 7 having compositions (the balance is Ni and inevitable impurities) shown in Table 1 described below were produced based on the manufacturing method according to the aforementioned embodiment. Specifically, for each of the test materials 2 to 7, C was added to molten Ni in a melting furnace so as to have a predetermined content percentage, and then the molten Ni was cooled such that a Ni alloy ingot of the test material was produced. On the other hand, for the test material 1, a Ni alloy ingot was produced without adding C. The content percentage of C in the Ni alloy plate material of the test material 1 was the content percentage of the inevitable impurity level and did not satisfy the composition condition (0.005 mass % or more) of the Ni alloy in the claims. Furthermore, the content percentage of C in the Ni alloy plate material of the test material 7 did not satisfy the composition condition (0.50 mass % or less) of the Ni alloy in the claims.

Then, hot-rolled Ni alloy plate materials were produced by hot-rolling the ingots of the Ni alloys of the test materials in a state in which the ingots were heated to hot rolling temperatures higher than the recrystallization temperatures of the Ni alloys. In this case, hot rolling was performed such that the thicknesses of the hot-rolled plate materials were 2 mm.

Thereafter, cold rolling was performed at room temperature (25° C.) on the test materials (hot-rolled plate materials) in which cracks did not occur to such an extent that a usage problem arose during hot rolling. After that, annealing was performed in order to remove distortion due to the cold rolling. Then, cold rolling and annealing were repeated such that the Ni alloy plate materials of the test materials were produced. During the final cold rolling, the Ni alloy plate materials each having a thickness of 1 mm were rolled at a rolling reduction of 80%. Thus, the thicknesses of the Ni alloy plate materials were set to 0.2 mm.

Then, the tensile strengths of the prepared Ni alloy plate materials of the test materials were measured.

Specifically, a plurality of test pieces of JIS No. 13B described in JIS Z2241 were cut out from each of the Ni alloy plate materials of the test materials such that the rolling directions of the Ni alloy plate materials were in the tensile directions. Then, a tensile test is performed according to JIS Z2241 such that the tensile strengths of the plurality of test pieces were measured. The average of the tensile strengths of the plurality of test pieces was taken as the tensile strength of each of the Ni alloy plate materials of the test materials. Furthermore, the volume resistivities of the test materials were measured according to JIS C2525. The tensile test results (tensile strengths) and the volume resistivities of the test materials are shown in Table 1 described below.

Specifically, in the test materials 5 to 7, cracks occurred to such an extent that a usage problem arose during hot rolling. It is believed that due to a large amount of added carbon, the hardnesses of the Ni alloys were improved, but the ductilities were reduced. Thus, cracks occurred. As for the test materials 5 and 6, the content percentages of C in the Ni alloys are smaller than that of the test material 7, and thus it is believed that occurrence of cracks can be significantly reduced or prevented by changing the conditions of hot rolling, for example. From this viewpoint, in the present invention, it is believed that a Ni alloy that contains only C, Ni, and inevitable impurities can be applied when C is 0.50 mass % or less.

In the test materials 1 to 4, the tensile strengths of the Ni alloy plate materials increased as the content percentages of C increased. Consequently, in the Ni alloy plate materials of the test materials 1 to 4, the tensile strengths of the Ni alloy plate materials of the test materials 2 to 4 in which the content percentages of C were 0.005 mass % or more became larger than the tensile strength of the Ni alloy plate material of the test material 1 in which the content percentage of C was less than 0.005 mass %. On the other hand, as the content percentages of C increased, the volume resistivities of the Ni alloy plate materials also increased. However, it is believed that the degree of increase in the volume resistivities of the Ni alloy plate materials of the test materials 2 to 4 is not particularly large. In this respect, only the Ni alloy plate materials (Ni alloys) are not used as negative electrode collectors, but the clad materials each having a three-layer structure including a pair of Cu layers made of Cu having a small volume resistivity and a Ni alloy layer are used as the negative electrode collectors, and thus it is believed that there is no problem even when the volume resistivities of the Ni alloy plate materials are somewhat large.

(Production of Clad Materials)

Next, the clad materials were produced based on the manufacturing method according to the aforementioned embodiment, using the test materials 1 to 4, in which cracks did not occur to such an extent that a usage problem arose, among the produced test materials. Specifically, a pair of Cu plate materials made of C1020 (oxygen free copper) that conforms to JIS H3100 were prepared. At this time, the Cu plate materials were prepared such that the thickness ratio of the Cu plate materials and each of the Ni alloy plate materials (the thickness of the Cu plate material:the thickness of the Ni alloy plate material:the thickness of the Cu plate material) was 1:3:1.

TABLE 1

| | Nb (MASS %) | C (MASS %) | TENSILE STRENGTH (MPa) | VOLUME RESISTIVITY ($\times 10^{-8}$ ($\Omega \cdot$ m)) |
|---|---|---|---|---|
| TEST MATERIAL 1 | 0.00 | 0.0023 | 663 | 7.5 |
| TEST MATERIAL 2 | 0.00 | 0.0054 | 676 | 7.6 |
| TEST MATERIAL 3 | 0.00 | 0.10 | 943 | 9.4 |
| TEST MATERIAL 4 | 0.00 | 0.1709 | 964 | 10.3 |
| TEST MATERIAL 5 | 0.00 | 0.26 | CRACK | CRACK |
| TEST MATERIAL 6 | 0.00 | 0.47 | CRACK | CRACK |
| TEST MATERIAL 7 | 0.00 | 0.55 | CRACK | CRACK |

(Experimental Results of Ni Alloys)

As shown in Table 1, the Ni alloy plate materials could be produced for the test materials 1 to 4 whereas Ni alloy plate materials could not be produced for the test materials 5 to 7.

Then, the pair of Cu plate materials and each of the Ni alloy plate materials having the compositions of the test materials 1 to 4 were rolled together in a state in which each of the Ni alloy plate materials was sandwiched between the pair of Cu plate materials in a thickness direction such that the pair of Cu plate materials and each of the Ni alloy plate materials were roll-bonded to each other. At this time, cold rolling was performed such that the total thickness of the pair of Cu plate materials and each of the Ni alloy plate materials was 0.5 mm. Then, diffusion annealing was performed on the pair of Cu plate materials and each of the Ni alloy plate materials of the test materials 1 to 4, which were bonded to each other. Diffusion annealing was performed at 850° C. for 3 minutes under a nitrogen atmosphere (non-oxidizing atmosphere). Then, cold rolling was performed at a rolling reduction of 80%. Thus, the clad materials of Comparative Example 1 and Examples 1 to 3 each having a thickness of 0.1 mm and having a three-layer structure in which the Cu layer, the Ni alloy layer, and the Cu layer were stacked in this order were produced. The clad material of Comparative Example 1 was produced using the Ni alloy plate material of the test material 1, and the clad materials of Examples 1 to 3 were respectively produced using the Ni alloy plate materials of the test materials 2 to 4.

Then, the tensile strengths of the clad materials of Comparative Example 1 and Examples 1 to 3 were measured by the same method as that for the aforementioned test materials. In addition, the volume resistivities of the clad materials of Comparative Example 1 and Examples 1 to 3 were obtained. The volume resistivities of the Ni alloy layers were taken as referring to the volume resistivities of the Ni alloy plate materials in Table 1, and $1.71 \times 10^{-8}$ ($\Omega \cdot m$) was used as the volume resistivity of the Cu layer. The tensile test results (tensile strengths) and the volume resistivities of the clad materials of Comparative Example 1 and Examples 1 to 3 are shown in Table 2 described below.

the same as that of the clad material of Comparative Example 1 using the test material 1, or became slightly larger. As the content percentages of C in the Ni alloys increased, the volume resistivities of the clad materials increased. However, the rates of increase in the volume resistivities of the clad materials of Examples 1 to 3 are less than about 6.5% of that of the clad material of Comparative Example 1, which is considered to be sufficiently small. In other words, it is believed that the volume resistivity increased to such an extent that a practical problem did not arise when the clad materials of Examples 1 to 3 were used as negative electrode collectors.

Consequently, the clad materials of Examples 1 to 3 that satisfy the composition conditions of the Ni alloy in the claims have sufficient mechanical strength and sufficiently low volume resistivity, and thus it has been confirmable that the clad materials of Examples 1 to 3 are suitable as negative electrode collectors. In particular, the clad materials of Examples 2 and 3 have more sufficient mechanical strength, and thus it has been confirmable that the clad materials of Examples 2 and 3 are more suitable as negative electrode collectors. In addition, in the clad materials of Examples 1 to 3, the Ni alloy layers are made of the Ni alloys that contain only C, Ni, and inevitable impurities, and thus the clad materials can be stably supplied and produced at low cost.

Second Example

In a second example, Ni alloy plate materials in which Ni alloys contained only C, Ni, Nb, and inevitable impurities and the compositions of C were different from each other were produced. Then, the tensile strengths as indexes of the

TABLE 2

| | CORE MATERIAL | TENSILE STRENGTH (MPa) | DEGREE OF HIGH STRENGTH (%) | VOLUME RESISTIVITY ($\times 10^{-8}$ ($\Omega \cdot m$)) | DEGREE OF INCREASE IN VOLUME RESISTIVITY (%) |
|---|---|---|---|---|---|
| COMPARATIVE EXAMPLE 1 | TEST MATERIAL 1 | 580 | | 3.2 | |
| EXAMPLE 1 | TEST MATERIAL 2 | 593 | 102.2 | 3.2 | 100.3 |
| EXAMPLE 2 | TEST MATERIAL 3 | 781 | 134.7 | 3.4 | 106.2 |
| EXAMPLE 3 | TEST MATERIAL 4 | 799 | 137.8 | 3.4 | 106.2 |

(Experimental Results of Clad Materials)

As shown in Table 2, the tensile strengths of the clad materials of Examples 1 to 3 respectively using the test materials 2 to 4 became higher than that of the clad material of Comparative Example 1 using the test material 1. Specifically, the tensile strengths of the clad materials of Examples 1 to 3 were higher by 2% or more than that of the clad material of Comparative Example 1. Consequently, it has been confirmable that the mechanical strengths of the clad materials can be improved by the Ni alloys that contain 0.005 mass % or more of C.

In particular, the tensile strengths of the clad materials of Examples 2 and 3 (the clad materials respectively using the test materials 3 and 4) were higher by 34% or more. Consequently, it has been confirmable that the mechanical strengths of the clad materials can be further improved by the Ni alloys that contain 0.10 mass % or more of C.

The volume resistivities of the clad materials of Examples 1 to 3 respectively using the test materials 2 to 4 were almost mechanical strengths and the volume resistivities of the produced Ni alloy plate materials were measured similarly to the first example. Similarly to the first example, clad materials each having a three-layer structure in which a Ni alloy layer made of the Ni alloy was sandwiched between a pair of Cu layers were produced, and the tensile strengths thereof were measured. In addition, the volume resistivities of the clad materials were obtained.

(Production of Ni Alloy Plate Materials of Test Materials)

First, Ni alloy plate materials of test materials 8 to 15 having compositions (the balance is Ni and inevitable impurities) shown in Table 3 described below were produced. Specifically, for each of the test materials 9 to 15, molten Ni was cooled in a state in which C and Nb were added to the molten Ni in a melting furnace so as to have a predetermined content percentage such that a Ni alloy ingot of the test material was produced. For the test material 8, a Ni alloy ingot was produced with adding Nb but without adding C. The content percentage of C in the Ni alloy plate material of the test material 8 was the content percentage of the inevitable impurity level and did not satisfy the composition condition (0.005 mass % or more) of the Ni alloy in the claims. Furthermore, for the test materials 8 to 15, Nb was added to the Ni alloys such that the content percentages of Nb were about 5.00 mass %.

Then, similarly to the first example, the Ni alloy plate materials of the test materials were produced. At the time of producing these Ni alloy plate materials, in the Ni alloy of the test material 15 that contains 0.47 mass % of C, cracks slightly occurred although a usage problem did not arise. Then, similarly to the first example, the tensile strengths and the volume resistivities of the Ni alloy plate materials of the test materials were measured. The tensile test results (tensile strengths) and the volume resistivities of the test materials are shown in Table 3 described below.

TABLE 3

|  | Nb (MASS %) | C (MASS %) | TENSILE STRENGTH (MPa) | VOLUME RESISTIVITY ($\times 10^{-8}$ ($\Omega \cdot$ m)) |
|---|---|---|---|---|
| TEST MATERIAL 8 | 5.01 | 0.0044 | 1123 | 25.2 |
| TEST MATERIAL 9 | 5.11 | 0.0070 | 1137 | 25.7 |
| TEST MATERIAL 10 | 5.11 | 0.0172 | 1150 | 25.8 |
| TEST MATERIAL 11 | 5.14 | 0.12 | 1176 | 25.6 |
| TEST MATERIAL 12 | 5.05 | 0.1908 | 1192 | 25.3 |
| TEST MATERIAL 13 | 5.08 | 0.22 | 1208 | 21.3 |
| TEST MATERIAL 14 | 5.12 | 0.37 | 1241 | 18.4 |
| TEST MATERIAL 15 | 5.08 | 0.47 | 1243 | 17.0 |

(Experimental Results of Ni Alloys)

As shown in Table 3, in the test materials 8 to 15, the tensile strengths of the Ni alloy plate materials increased as the content percentage of C increased, similarly to the Ni alloy plate materials of the test materials 1 to 4 in Table 1. Consequently, in the Ni alloy plate materials of the test materials 8 to 15, the tensile strengths of the Ni alloy plate materials of the test materials 9 to 15 in which the content percentages of C were 0.005 mass % or more became higher than the tensile strength of the Ni alloy plate material of the test material 8 in which the content percentage of C was less than 0.005 mass %. Furthermore, as the content percentages of C increased, the volume resistivities of the Ni alloy plate materials hardly changed, but when the content percentages of C exceeded about 0.10 mass %, the volume resistivities of the Ni alloy plate materials became smaller on the contrary.

In the Ni alloy plate materials of the test materials 8 to 15, the content percentages of C were 0.20 mass % or more, but cracks did not occur to such an extent that a usage problem arose. This is conceivably because a compound of Nb and C (NbC, for example) precipitated in the Ni alloys such that the amount of pure C in Ni decreased due to the compound of Nb and C, and thus the influence of a ductility reduction due to C became unlikely to appear.

The tensile strengths of the Ni alloy plate materials of the test materials 8 to 15 became higher than those of the Ni alloy plate materials of the test materials 1 to 4. This is conceivably because the mechanical strengths of the Ni alloy plate materials were further improved due to the influence of solid solution strengthening caused by Nb, for example, in addition to the improvement of the mechanical strengths caused by the addition of C.

The volume resistivities of the Ni alloy plate materials of the test materials 8 to 15 became larger than those of the Ni alloy plate materials of the test materials 1 to 4. This is conceivably because Nb having resistance larger than that of Ni was contained in the Ni alloys. Incidentally, the volume resistivities of the Ni alloy plate materials of the test materials 9 to 15 hardly increased, and thus it is believed that there is no adverse effect on the volume resistivities due to inclusion of 0.50 mass % or less of C. Furthermore, only the Ni alloy plate materials (Ni alloys) are not used as negative electrode collectors, but the clad materials each having a three-layer structure including a pair of Cu layers and a Ni alloy layer are used as the negative electrode collectors, and thus it is believed that there is no problem even when the volume resistivities of the Ni alloy plate materials are somewhat large.

(Production of Clad Materials)

Next, similarly to the first example, the clad materials of Comparative Example 2 and Examples 4 to 10 each having a three-layer structure were produced using the prepared test materials 8 to 15. The clad material of Comparative Example 2 was produced using the Ni alloy plate material of the test material 8, and the clad materials of Examples 4 to 10 were produced using the Ni alloy plate materials of the test materials 9 to 15, respectively.

Then, the tensile strengths of the clad materials of Comparative Example 2 and Examples 4 to 10 were measured by the same method as that for the aforementioned test materials. In addition, the volume resistivities of the clad materials of Comparative Example 2 and Examples 4 to 10 were obtained. The tensile test results (tensile strengths) and the volume resistivities of the clad materials of Comparative Example 2 and Examples 4 to 10 are shown in Table 4 described below.

TABLE 4

|  | CORE MATERIAL | TENSILE STRENGTH (MPa) | DEGREE OF HIGH STRENGTH (%) | VOLUME RESISTIVITY ($\times 10^{-8}$ ($\Omega \cdot$ m)) | DEGREE OF INCREASE IN VOLUME RESISTIVITY (%) |
|---|---|---|---|---|---|
| COMPARATIVE EXAMPLE 2 | TEST MATERIAL 8 | 902 |  | 3.9 |  |
| EXAMPLE 4 | TEST MATERIAL 9 | 916 | 101.6 | 3.9 | 100.0 |

TABLE 4-continued

|  | CORE MATERIAL | TENSILE STRENGTH (MPa) | DEGREE OF HIGH STRENGTH (%) | VOLUME RESISTIVITY (×10$^{-8}$ (Ω·m)) | DEGREE OF INCREASE IN VOLUME RESISTIVITY (%) |
|---|---|---|---|---|---|
| EXAMPLE 5 | TEST MATERIAL 10 | 925 | 102.5 | 3.9 | 100.0 |
| EXAMPLE 6 | TEST MATERIAL 11 | 937 | 103.9 | 3.9 | 100.0 |
| EXAMPLE 7 | TEST MATERIAL 12 | 958 | 106.2 | 3.9 | 100.0 |
| EXAMPLE 8 | TEST MATERIAL 13 | 968 | 107.3 | 3.8 | 97.4 |
| EXAMPLE 9 | TEST MATERIAL 14 | 988 | 109.5 | 3.7 | 94.9 |
| EXAMPLE 10 | TEST MATERIAL 15 | 989 | 109.6 | 3.7 | 94.9 |

(Experimental Results of Clad Materials)

As shown in Table 4, the tensile strengths of the clad materials of Examples 4 to 10 respectively using the test materials 9 to 15 became larger than that of the clad material of Comparative Example 2 using the test material 8. Specifically, the tensile strengths of the clad materials of Examples 4 to 10 were higher by 1.5% or more than that of the clad material of Comparative Example 2. Consequently, it has been confirmable that the mechanical strengths of the clad materials can be improved by the Ni alloys that contain only C, Ni, Nb, and inevitable impurities and in which C is 0.005 mass % or more.

In particular, the tensile strengths of the clad materials of Examples 7 to 10 (the clad materials respectively using the test materials 12 to 15) were higher by 6% or more. Consequently, it has been confirmable that the mechanical strengths of the clad materials can be further improved by the Ni alloys that contain only C, Ni, Nb, and inevitable impurities and in which C is 0.19 mass % or more.

The volume resistivities of the clad materials of Examples 4 to 10 respectively using the test materials 9 to 15 were almost the same as that of the clad material of Comparative Example 2 using the test material 8, or the volume resistivities became smaller.

Consequently, the clad materials of Examples 4 to 10 that satisfy the composition conditions of the Ni alloy in the claims have sufficient mechanical strength and sufficiently low volume resistivity, and thus it has been confirmable that the clad materials of Examples 4 to 10 are suitable as negative electrode collectors. In particular, the clad materials of Examples 7 to 10 have more sufficient mechanical strength, and thus it has been confirmable that the clad materials of Examples 7 to 10 are more suitable as negative electrode collectors. Furthermore, the clad materials of Examples 8 to 10 have still more sufficient mechanical strength, and the volume resistivities thereof can become smaller, and thus it has been confirmable that the clad materials of Examples 8 to 10 are still more suitable as negative electrode collectors.

The tensile strengths of the clad materials of Examples 4 to 10 using the Ni alloys that contain only C, Ni, Nb, and inevitable impurities became higher than those of the clad materials of Examples 1 to 3 using the Ni alloys that contain only C, Ni, and inevitable impurities, and the volume resistivities thereof also became larger. Consequently, it has been found that a clad material using a Ni alloy that contains only C, Ni, Nb, and inevitable impurities as Examples 4 to 10 in which it has been found that a tensile strength of about 910 MPa or more and about 990 MPa or less is obtained is preferably used as a negative electrode collector as compared with Examples 1 to 3 in which it has been found that a tensile strength of about 590 MPa or more and about 810 MPa or less is obtained, when mechanical strength is more important. Furthermore, it has been found that a clad material using a Ni alloy that contains only C, Ni and inevitable impurities as Examples 1 to 3 in which it has been found that a volume resistivity of about 3.2×10$^{-8}$ Ω·m or more and about 3.4×10$^{-8}$ Ω·m or less is obtained is preferably used as a negative electrode collector as compared with Examples 4 to 10 in which it has been found that a volume resistivity of about 3.7×10$^{-8}$ Ω·m or more and about 3.9×10$^{-8}$ Ω·m or less is obtained, when volume resistivity is more important.

In the second example, the example in which Nb is added to the Ni alloys such that the content percentages of Nb are about 5 mass % has been shown, but it is believed that the Ni alloys (clad materials) having improved mechanical strength and small volume resistivity can be produced as long as Nb is added in a predetermined range to the Ni alloys. In this case, it is believed that it is preferable to add Nb to the Ni alloys such that the content percentage of Nb is 3.0 mass % or more, and it is more preferable to add Nb to the Ni alloys such that the content percentage of Nb is 4.7 mass % or more. Furthermore, Nb is a rare element, and thus from the viewpoint of stable supply and cost reduction, it is believed that it is preferable to add Nb to the Ni alloys such that the content percentage of Nb is 10.0 mass % or less, and it is more preferable to add Nb to the Ni alloys such that the content percentage of Nb is 5.5 mass % or less.

Third Example

In a third example, a plurality of three-layered clad materials having different thickness ratios of Ni alloy layers were produced using the Ni alloy plate material and the Cu plate materials of the test material 4 produced in the first example. A method for producing the clad materials is the same as that in the first example except that the thickness ratio of a Cu layer, a Ni alloy layer, and a Cu layer (the thickness of the Cu layer:the thickness of the Ni alloy layer:the thickness of the Cu layer) is properly varied. Then, the tensile strengths of the clad materials having different thickness ratios were measured in the same manner as in the first example. In addition, the volume resistivities of the clad materials having different thickness ratios were obtained. The tensile strengths and the volume resistivities of the clad materials are shown in FIG. 6. Note that the thickness ratios of the Ni alloy layers in FIG. 6 are values obtained by dividing the thicknesses of the Ni alloy layers by the thicknesses of the clad materials, and increase as the thicknesses of the Ni alloy layers increase.

Figure 6:
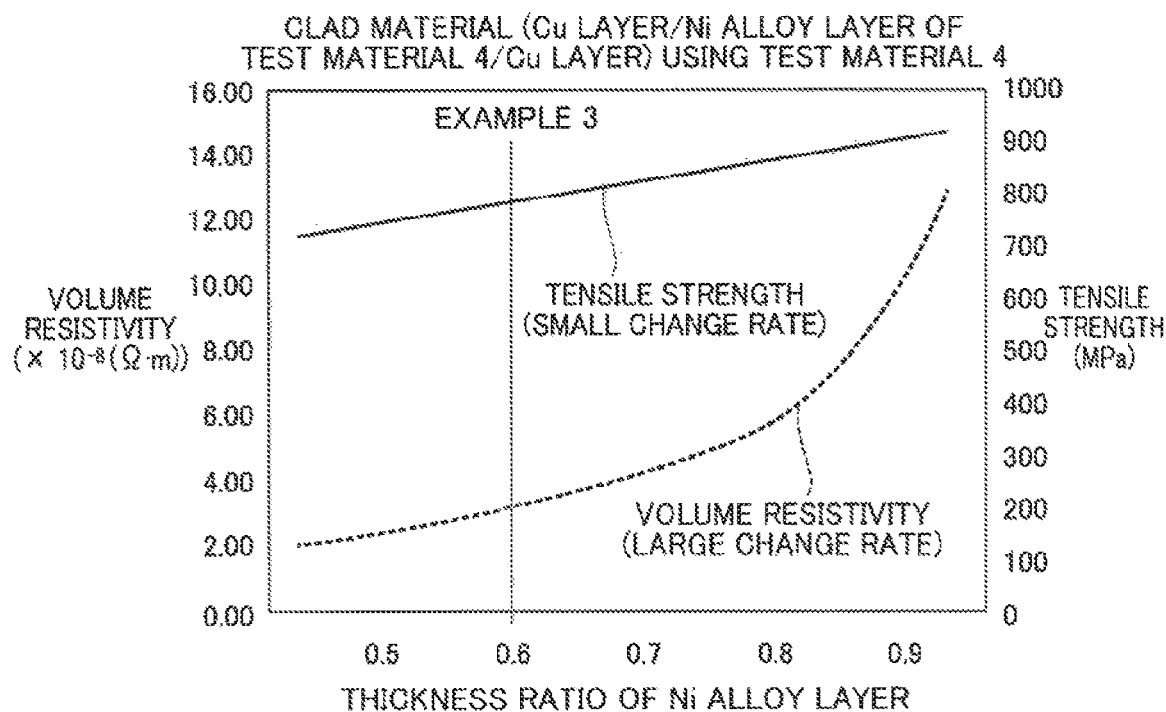
FIG. 6 A graph showing a change in tensile strength and a change in volume resistivity with respect to the thickness ratio of a Ni alloy layer based on the results of an experiment conducted to confirm the effect of the present invention.

As shown in FIG. 6, the tensile strength of the clad material linearly increased as the thickness ratio of the Ni alloy layer increased. On the other hand, the volume resistivity of the clad material quadratically increased as the thickness ratio of the Ni alloy layer increased. From this fact, when the thickness ratio of the Ni alloy layer is increased in order to increase the mechanical strength, the rate of increase in the volume resistivity tends to be large, and thus it has been confirmable that means other than changing the thickness ratio of each layer of the clad material is required in order to further improve the mechanical strength of the negative electrode collector while reducing the rate of increase in the volume resistivity. Furthermore, it has been confirmable that as in the present invention, the Ni alloy of which the Ni alloy layer is made contains 0.005 mass % or more and 0.50 mass % or less of C such that the mechanical strength of the negative electrode collector can be further improved by the means other than changing the thickness ratio of each layer of the clad material.

Modified Examples

The embodiment and examples disclosed this time must be considered as illustrative in all points and not restrictive. The range of the present invention is not shown by the above description of the embodiment and examples but by the scope of claims for patent, and all modifications (modified examples) within the meaning and range equivalent to the scope of claims for patent are further included.

For example, while the example in which the negative electrode collector 5b made of the clad material 50 (the clad material for the negative electrode collector) is applied to the lithium-ion secondary battery (battery 100) has been shown in the aforementioned embodiment, the present invention is not restricted to this. According to the present invention, the negative electrode collector made of the clad material for the negative electrode collector may be applied to a secondary battery other than the lithium-ion secondary battery. For example, the negative electrode collector may be applied to a sodium-ion secondary battery or a magnesium secondary battery.

DESCRIPTION OF REFERENCE NUMERALS

50: clad material (clad material for a negative electrode collector)
51: Ni alloy layer
52: Cu layer
53: Cu layer
151: ingot (smelted material)
152, 153: Cu plate material
351: Ni alloy plate material

The invention claimed is:

1. A clad material for a negative electrode collector of a secondary battery, comprising:
   a Ni alloy layer made of a Ni alloy that contains 0.37 mass % or more and 0.47 mass % or less of C, 5.08 mass % or more and 5.12 mass % or less of Nb, 0.50 mass % or less of inevitable impurities including Si, Mn, Al, Fe, Mg, O and N, and the balance being Ni; and
   a pair of Cu layers respectively bonded to opposite surfaces of the Ni alloy layer and that contain 99 mass % or more of Cu.

2. The clad material for a negative electrode collector of a secondary battery according to claim 1, wherein the Ni alloy contains 0.37 mass % or more and 0.40 mass % or less of C.

3. A method for manufacturing a clad material according to claim 1, comprising:
   producing a Ni alloy plate material made of a Ni alloy that contains 0.37 mass % or more and 0.47 mass % or less of C, 5.08 mass % or more and 5.12 mass % or less of Nb, 0.50 mass % or less of inevitable impurities including Si, Mn, Al, Fe, Mg, O and N, and the balance being Ni by performing hot rolling and cold rolling on a smelted material in which C is added to pure Ni; and
   producing a clad material including a Ni alloy layer made of the Ni alloy and a pair of Cu layers respectively bonded to opposite surfaces of the Ni alloy layer and that contain 99 mass % or more of Cu by performing rolling and diffusion annealing in a state in which the Ni alloy plate material is sandwiched between a pair of Cu plate materials that contain 99 mass % or more of Cu.

* * * * *